United States Patent [19]

Castro

[11] Patent Number: 5,073,414

[45] Date of Patent: Dec. 17, 1991

[54] FLAME SPRAYING PROCESS

[75] Inventor: Cesar O. Castro, Houston, Tex.

[73] Assignee: Shell Oil Company, Houston, Tex.

[21] Appl. No.: 503,417

[22] Filed: Mar. 30, 1990

[51] Int. Cl.$^5$ ............................................. B05D 1/08
[52] U.S. Cl. .................................... 427/423; 427/34; 427/422; 427/421; 427/314
[58] Field of Search ................ 427/423, 34, 422, 421, 427/314; 428/413; 523/400, 427

[56] References Cited

U.S. PATENT DOCUMENTS

| | | | |
|---|---|---|---|
| 3,362,940 | 1/1968 | Edwards et al. | 260/88.2 |
| 3,440,079 | 4/1969 | Jensen | 117/22 |
| 3,723,165 | 3/1973 | Longo et al. | 117/93 |
| 4,049,842 | 9/1977 | Gerek et al. | 427/34 |
| 4,604,306 | 8/1986 | Browning | 427/423 |
| 4,632,309 | 12/1986 | Reimer | 239/8 |
| 4,861,675 | 8/1989 | George | 428/501 |
| 4,962,137 | 10/1990 | McKinney et al. | 523/400 |

Primary Examiner—Shrive Beck
Assistant Examiner—Roy V. King

[57] ABSTRACT

A coated object is produced by flame spraying the object with a substantially molten polymeric material which comprises a blend containing polybutylene homopolymer or copolymer and an adhesion promoter.

8 Claims, No Drawings

FLAME SPRAYING PROCESS

FIELD OF THE INVENTION

This invention relates to a process for coating an object with polybutylene homopolymer or copolymer. More particularly, the invention relates to a flame spraying process for coating a solid object with polymeric material comprising polybutylene homopolymer or copolymer.

BACKGROUND OF THE INVENTION

Polybutylene homopolymers and copolymers are well known in the art and are shaped and/or formed by a variety of conventional techniques such as extrusion or injection molding into objects of known utility. For other purposes, it would be of advantage to coat objects with a coating of the polymer. Such coatings provide, for example, corrosion or abrasion resistance or as a tie layer for bonding other polymers to a substrate which may not adhere well.

SUMMARY OF THE INVENTION

The present invention relates to a process for coating objects with a polybutylene homopolymer or copolymer and to the coated objects thereby produced. More particularly, the present invention relates to a process for flame spray coating an object with polybutylene homopolymer or copolymer. The invention also relates to the coated objects thereby produced.

DESCRIPTION OF THE INVENTION

The polymeric material employed to flame spray coat objects according to the process of the invention is an isotactic polybutylene optionally blended with tackifying resins.

The purpose of this flame coating technique is to provide corrosion and abrasion protection for the substrates or to deposit hot melt adhesives to substrates. Polybutylene such as DP8910 and DP0800 available from Shell Chemical Company, a division of Shell Oil Company is usable with this technique.

To create the unique coated articles, isotactic polybutylene, in powder form, can be sprayed onto various substrates using a propane flame without the need for an additional solvent. Flame spraying is accomplished by blowing a finely ground polybutylene through a flame and depositing it on the desired substrate, for example stainless steel or aluminum panel or rod. It is contemplated that other substrates can be used to prepare the unique flame coated articles. For example, it is possible that even polymer substrates, with melting point similar to or higher than the melting temperature of the coating polymer, could be used to prepare the unique coated articles.

The flame coated articles are preferably prepared with isotactic polybutylenes, including polybutylene homopolymers and copolymers.

The flame spraying is preferably performed at rates of 60-150 square feet per hour creating a 8-10 mil coating on the substrates. During flame coating, the face of the substrate can be heated to about 300° F. while the backside of the substrate should heat to less than 200° F. The flame coated articles can be modified by adding pigments or other stabilizers to the polybutylene polymer prior to the flame coating procedure.

The term "polybutylene" refers to polymers of butene-1 homopolymer and butene-1 copolymers such as butene-1-ethylene, butene-1-propylene, and butene-1-alpha olefins having from 5 to 8 carbon atoms.

Polybutylene polymers are composed of linear chain molecules with the regular and spacially ordered arrangement of ethyl side groups, the pendant groups that result when one butene is polymerized across the 1,2 carbon double bond along an ethylene chain backbone (U.S. Pat. No. 3,362,940. When cooled from melt, the ethyl side groups initially align in a tetragonal spatial arrangement, developing a little over one half of the ultimate crystallinity (form II). With time, the tetragonal crystalline phase transforms into a stable hexagonal spatial arrangement with subsequent development of additional crystallinity (form I). This is a very slow process, the transformation being completed in the neat polymer over a period of several days.

Butene-1 can be copolymerized with a variety of alpha-olefins to provide useful copolymers such as those taught in U.S. Pat. No. 3,362,940 which is herein incorporated by reference. Butene-1/ethylene copolymers, with ethylene in the 11–20 mole percent range are of special interest flame sprayed in adhesive coatings as the ethylene comonomer produces a lower glass transition temperature (Tg) amorphous phase, reduces further the crystallization rate, and reduces the ultimate level of crystallinity in the polymer. Such are advantages in the development of long open time flame sprayed adhesives, as a lower Tg polymer and a higher amorphous phase polymer offers wider formulating latitude in combination with compatible resins, waxes, oils, fillers, and additives.

The adhesion of polybutylene to various substrates can be improved by incorporation functionality into the chain by copolymerization or by grafting. Ethylene acrylic acid copolymers are examples of such copolymers.

The flame spray process of the invention is usefully conducted employing the polybutylene polymer without the addition of other materials. However, conventional additives such as antioxidants and stabilizers which are designed to improve the properties of the coated object may be incorporated within the polybutylene polymer. In a particular embodiment, however, the polybutylene is blended with a second polymeric component and the resulting blend is employed in the flame coating process.

The method of forming a blend to be used in the process of the invention, when blends are employed, is not material so long as a uniform blend of the components is produced without undue degradation of the components or the resulting blend. In one modification the polybutylene polymer and the tackifying resin are coextruded to produce the blend as an extrudate. In an alternative modification, the components are dry blended as powders or blended in a mixing device which exhibits high shear.

The blends used in the process of the invention may optionally contain other conventional additives such as antioxidants, stabilizers and fire retardant materials, and other additives designed to improve the processability of the polymers or improve the properties of the resulting blend. Such additives are added by conventional methods prior to, together with, or subsequent to the blending of the component polymers.

The general methods of flame spraying polymeric or other finely divided materials are known in the art. The basic concept of flame spraying of thermoplastic polymeric materials involves an apparatus wherein the polymeric material, a fuel and oxygen-containing gas are introduced into a combustion chamber wherein the fuel and oxygen-containing gas mixture ignites, thereby giving off heat which serves to substantially melt the polymeric material. The molten polymeric material is thereafter propelled from the combustion chamber by a source of propelling gas onto the surface of the object to be coated. An alternate modification of the process, also often termed flame spraying, although not directly involving a flame, employs the use of a heated wire or filament to melt the polymer to be sprayed. The use of the flame produced by combustion of a fuel in air is generally preferred.

Illustrative fuels are generally low-molecular weight hydrocarbons which ignite easily and are normally gaseous at ambient conditions. Examples of suitable fuels include propane, methane, butane, propylene, ethylene, and acetylene. As the oxygen-containing gas employed to cause combustion of the fuel, a variety of mixtures of oxygen and other non-combustible gases are usefully employed. Air is preferred. A variety of gaseous materials is useful as the propelling gas including nitrogen, argon, and helium. Largely for convenience and economy, the use of air as the propelling gas as well as the combustion gas is preferred. Examples of such flame spraying processes and apparatus therefor are known in the art. A particularly useful process and equipment for use in the process is described in Reimer, U.S. Pat. No. 4,632,309. Other related processes are illustrated by U.S. Pat. Nos. 4,604,306, 3,723,165, and 3,440,079.

In a representative embodiment of the process of the invention the polymeric material comprising the polybutylene polymer optionally blended with tackifying resin, provided in a finely divided powder form, is mixed with propane fuel and air and passed to a combustion chamber where the fuel and air are ignited, thereby providing the energy required to substantially melt the polymeric material. The molten polymeric material is propelled from the combustion chamber and from the apparatus through the use of compressed air as a propelling carrier gas and is allowed to impact upon an object, which is to be coated. The target object, being relatively cool, will cause the molten polymer to solidify and thereby provide the coating.

The state of division of the polymeric material powder as well as the viscosity of the polybutylene polymer, is important in obtaining good coatings on the target object. The polymeric material to be flame sprayed should be of a size from about 20 mesh to about 100 mesh, preferably from about 50 mesh to about 80 mesh. The polymers to be flame sprayed are preferably ground to a small particle size using a cryogenic grinder. Isotactic polybutylene having a melt index from about 1 to about 1000 may be used in the process of the present invention. Preferably polybutylene should have a melt index of between about 45 and about 400 so that the coating will be useful and the spraying process itself will proceed smoothly.

The object to be coated is a solid object for which a tough, wear, and corrosion resistant coating is desired and objects of metal, glass, ceramic, plastic, or other material may be coated by the present process. More frequently, the process is employed to provide a coating of polybutylene or blend thereof on metal objects. The process of the invention may be used in conjunction with other polymeric coatings wherein the object to be coated has a based coat of a first polymeric composition, such as another polyolefin, and a subsequent top coat of polybutylene or polybutylene blend. Alternatively, the coating comprising polybutylene may be used to provide a base coat suitable for subsequent top coating with a second composition. The process is particularly suitable for coating both internal and external automotive parts such as drive shafts and suspension springs and for coating storage tanks, food processing equipment and industrial pipe.

The invention is further illustrated by the following Illustrative Embodiments which should not be construed as limiting.

EXAMPLE

Several grades of isotactic polybutylene from Shell Chemical Company PB0400, PB0800, DP8510, and DP8910 with melt flows of 20, 200, 45 and 1000 respectively were cryogenically ground to a particle size of about 70 mesh for PB0400, PB0800, and DP8510 and 50 mesh for DP8910. The powders were dry blended with any additives and sprayed onto metal panels of aluminum and steel approximately 4 inches by 12 inches by 3/16 inch thick. The additives were adhesion promoters specifically EMAA and EVA. The plates were flame dried and heated to about 225° F. then coated by flame spraying until a uniform smooth coating was achieved. The results are summarized below.

EXAMPLE 1

(Control)

PB0400 polybutylene with no adhesion promoter was flame sprayed onto metal plates. The powder did not flow evenly during the flame spraying resulting in non-uniform coatings. The resulting coatings peeled off easily without tearing, indicating little or no adhesion.

EXAMPLE 2

A blend of PB0400 polybutylene with 10 wt % ethylene methacrylic acid was flame sprayed onto metal plates. The powder flow was erratic resulting in non-uniform coatings. The resulting coatings tore repeatedly when attempting to peel them off, indicating good adhesion.

EXAMPLE 3

A blend of PB0400 polybutylene with 10 wt % ethylene vinyl acetate was flame sprayed onto metal plates. The powder flow was erratic resulting in non-uniform coatings. The resulting coatings tore repeatedly when attempting to peel them off, indicating good adhesion.

EXAMPLE 4

(Control)

PB0800 polybutylene with no adhesion promoter was sprayed as above. The blend had excellent flame spray characteristics with good powder flow behavior. The resulting coatings peeled off easily without tearing, indicating little or no adhesion.

EXAMPLE 5

A blend of PB0800 polybutylene with 10 wt % ethylene methacrylic acid was flame sprayed as above. The blend had excellent flame spray characteristics with good powder flow behavior. The resulting coatings tore repeatedly when attempting to peel them off, indicating good adhesion.

EXAMPLE 6

A blend of PB0800 polybutylene with 10 wt % ethylene vinyl acetate was flame sprayed as above. The blend had excellent flame spray characteristics with good powder flow behavior. The resulting coatings tore repeatedly when attempting to peel them off, indicating good adhesion.

EXAMPLE 7

(Control)

DP8510 polybutylene with no adhesion promoter was flame sprayed onto metal plates. The blend had excellent flame spray characteristics with good flow behavior. The resulting coatings peeled off easily without tearing, indicating little or no adhesion.

EXAMPLE 8

A blend of DP8510 polybutylene with 10 wt % ethylene methacrylic acid was flame sprayed as above. The blend had excellent flame spray characteristics with good flow behavior. The resulting coatings tore repeatedly when attempting to peel them off, indicating good adhesion.

EXAMPLE 9

A blend of DP8510 polybutylene with 10 wt % ethylene vinyl acetate was flame sprayed as above. The blend had excellent flame spray characteristics with good flow behavior. The resulting coatings tore repeatedly when attempting to peel the off, indicating good adhesion.

EXAMPLE 10

(Control)

DP8910 polybutylene with no adhesion promoter was flame sprayed onto metal plates. The blend had excellent flame spray characteristics with good flow behavior. The resulting coatings peeled off easily without tearing, indicating little or no adhesion.

EXAMPLE 11

A blend of DP8910 polybutylene with 10 wt % ethylene methyacrylic acid was flame sprayed onto metal plates. The blend had excellent flame spray characteristics with good flow behavior. The resulting coatings tore repeatedly when attempting to peel them off, indicating good adhesion.

EXAMPLE 12

A blend of DP8910 polybutylene with 10 wt % ethylene vinyl acetate was flame sprayed as above. The blend had excellent flame spray characteristics with good flow behavior. The resulting coatings tore repeatedly when attempting to peel them off, indicating good adhesion.

What is claimed is:

1. A process for coating a solid object with a polymeric material comprising heating the powdered polymeric material comprising a blend of a polybutylene homopolymer or copolymer, having a melt index between about 1 and about 1000, with from about 1 to about 35 percent by weight of the total polymeric material an adhesion promoter selected from the group consisting of ethylene-methacrylic acid copolymer and ethylene vinyl acetate copolymer to substantially melt the polymeric material and thereafter propelling the substantially molten polymeric material by flame spraying onto the surface of the solid object, thereby forming a coating wherein said powdered polymeric material has a particle size from about 20 mesh to about 100 mesh.

2. The process of claim 1 wherein the polybutylene copolymer is a butene-1/ethylene copolymer.

3. The process of claim 2 wherein the copolymer has between about 5 and 25 mole percent ethylene.

4. The process of claim 1 wherein the polybutylene has a melt index of between about 45 and about 400.

5. The process of claim 1 wherein the adhesion promoter is present at from about 5 to about 15 percent by weight.

6. The process of claim 1 wherein the adhesion promoter is present from about 10 percent by weight.

7. The process of claim 1 wherein the substrate is heated to above 200° F. before coating.

8. The process of claim 1 wherein the substrate is heated to above 225° F. before coating.

* * * * *